Dec. 16, 1958        G. E. CARON        2,864,655
AUTOMATIC SILO ENSILAGE UNLOADER

Filed May 12, 1955        4 Sheets-Sheet 1

Gerard E. Caron
INVENTOR.

BY *Clarence A. O'Brien*
*and Harvey B. Jacobson*
Attorneys

Dec. 16, 1958  G. E. CARON  2,864,655
AUTOMATIC SILO ENSILAGE UNLOADER
Filed May 12, 1955  4 Sheets-Sheet 3

Gerard E. Caron
INVENTOR.

BY Clarence A. O'Brien
and Harvey B. Jacobson
Attorneys

Dec. 16, 1958   G. E. CARON   2,864,655
AUTOMATIC SILO ENSILAGE UNLOADER
Filed May 12, 1955   4 Sheets-Sheet 4

Gerard E. Caron
INVENTOR.

United States Patent Office 2,864,655
Patented Dec. 16, 1958

2,864,655

AUTOMATIC SILO ENSILAGE UNLOADER

Gerard E. Caron, Westford, Vt.

Application May 12, 1955, Serial No. 507,889

9 Claims. (Cl. 302—56)

This invention relates to a silo unloader and more specifically provides a device for automatically removing silage from a silo and is adapated to rest solely upon the upper surface of the silage thereby eliminating the use of complicated hoists or other mechanisms for suspending the device from the top of the silo.

An object of the present invention is to provide a silo unloader including a frame rotatably mounted within a silo and supported solely on the upper surface of the silage therein together with self-contained driving means for rotating the frame within the silo and also for excavating the silage from the center of the silo upwardly through a suitable discharge pipe into a discharge chute or other means.

Still another object of the present invention is to provide a silo unloader in conformance with the preceding objects which includes a pair of screw auger conveyors urging the silage inwardly toward the center thereof together with rotating diggers positioned forwardly of the path of movement of the rotating augers thereby thoroughly loosening the silage so that the auger conveyors may move the same radially inwardly toward the center of the silo.

Another important feature of the persent invention is to provide a silo unloader in conformance with the preceding objects in which the silage is excavated from the center of the silo by utilization of a fan wherein the silage is picked up and blown outwardly through a discharge tube.

Still another salient feature of the present invention is the provision of a silo unloader conformable to the preceding objects in which a pair of substantially frusto-conical cutters are provided at remote ends of the frame member for engaging the inner surface of the periphery of the silo thereby effectively removing the silage from the inner surface of the silo thereby preventing the accumulation and freezing of silage on the inner surface of the silo in areas having low temperatures.

Other important objects of the present invention are to provide a silo unloader which is simple in construction, easy to manipulate, efficient in operation, well adapted for its intended purposes and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
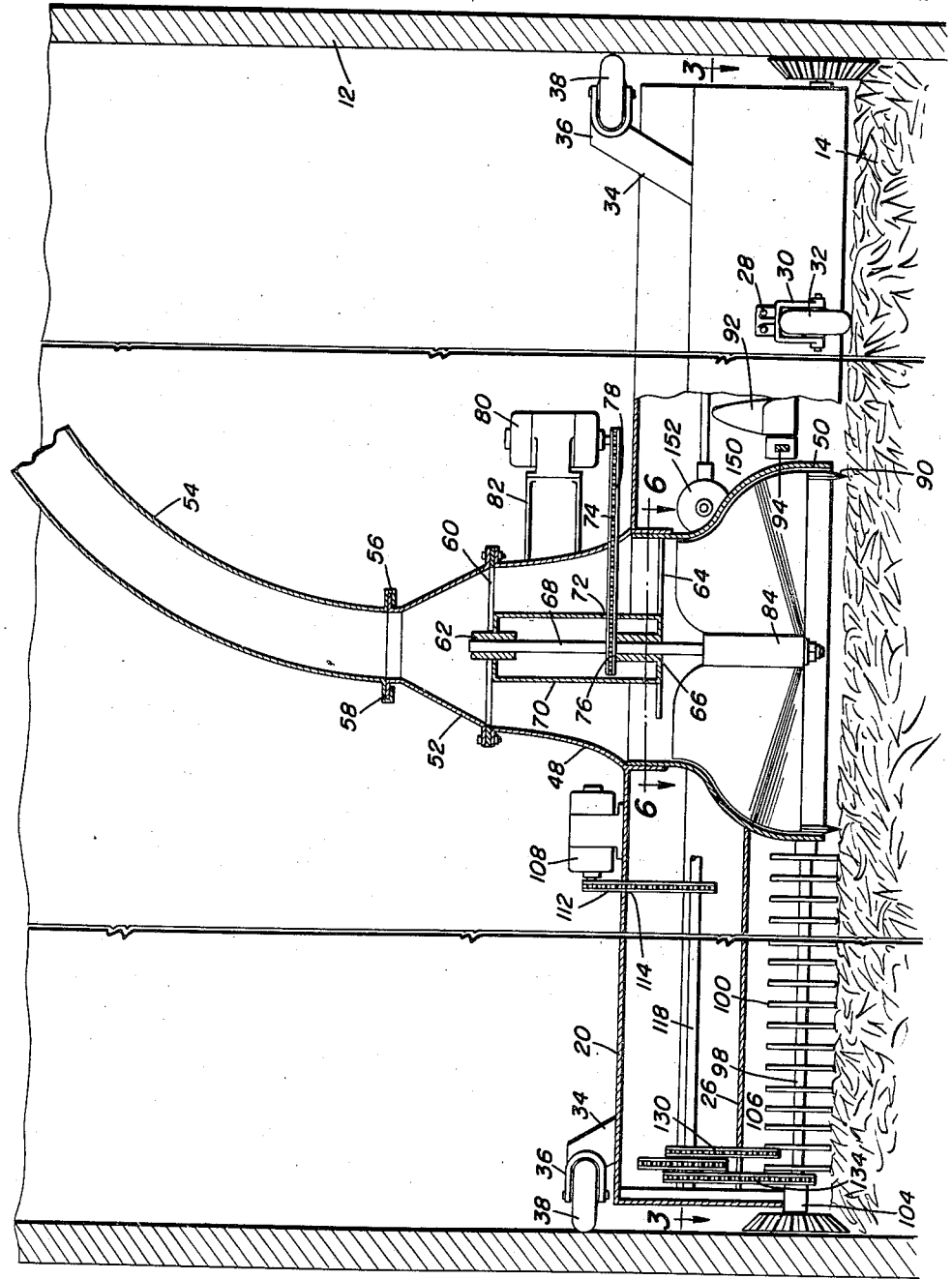
Figure 2 is a side elevational view of the construction of Figure 1 with portions thereof being broken away showing the details of construction of the excavating fan together with the driving means therefor and the driving means for rotating the diggers, cutters and screw augers.
Figure 3:
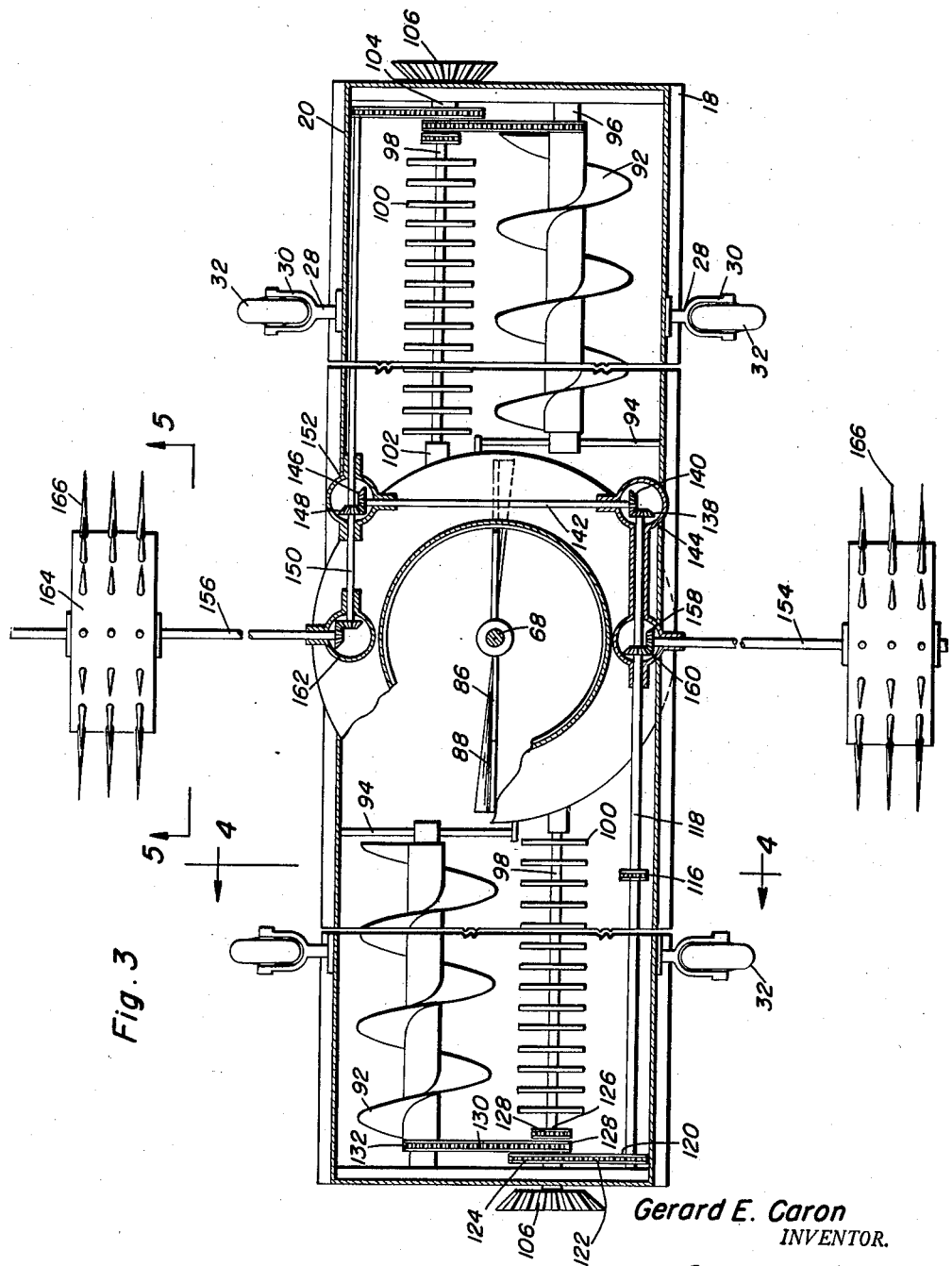
Figure 3 is a plan sectional view taken substantially upon a plane passing along section line 3—3 of Figure 2 showing the relationships of the various elements of the present invention together with the driving mechanism therefor.
Figure 5:
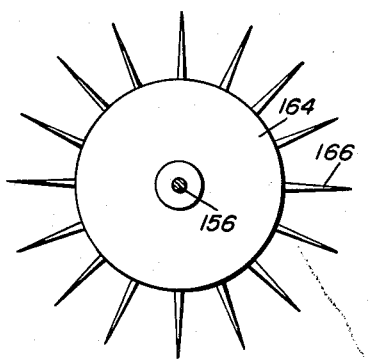
Figure 6:
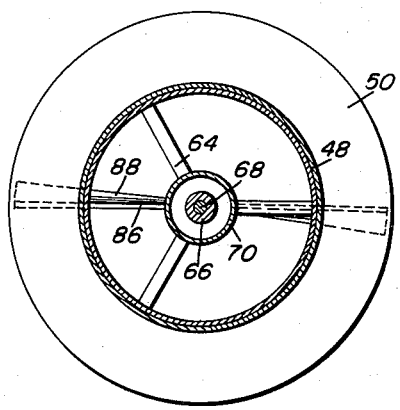

Figure 5 is a detailed sectional view taken substantially upon a plane passing along section line 5—5 of Figure 3 showing the details of construction of one of the driving drums with the spikes thereon for rotating the silo unloader of the preesnt invention within the silo; and Figure 6 is a detailed plan sectional view taken substantially upon a plane passing along section line 6—6 of Figure 2 showing the relationship of the central housing and the fan positioned therein together with the supporting means for the fan.

Referring now specifically to the drawing, it will be seen that the numeral 10 generally designates the silo unloader of the present invention for positioning in the interior of a cylindrical silo 12 for removing the ensilage 14 positioned therein.

The silo unloader 10 generally includes a rectangular frame generally designated by the numeral 16 and including longitudinal side rails 18 together with a generally rectangular covering shield 20 that is divided into a rear lower compartment generally designated by the numeral 22 and an upper compartment generally designated by the numeral 24 by an inclined partition 26. Secured to and projecting from the framework 16 is a pair of outwardly extending brackets 28 each of which are provided with a U-shaped end 30 for receiving a rotatable supporting wheel 32 which engages the upper surface of the silage 14 within the silo 12 thereby forming a support for the unloader 10. It will be noted that the wheels 32 mounted in the path of movement of the unloader 10 are positioned above the wheels 32 following the path of movement of the unloader 10 thereby retaining the unloader 10 in a level condition.

Centrally disposed at each end of the frame 16 is an upstanding and outwardly extending bracket 34 terminating in an outwardly opening U-shaped end portion 36 for journaling a guide wheel 38 wherein the guide wheel 38 engages the inner periphery of the silo 12 for retaining the frame 16 in diametric position within the cylindrical silo 12. A pair of horizontal brace members 40 project outwardly in converging relation from each side of the frame 12 and are attached to the frame 16 adjacent the ends thereof. The horizontal brace members 40 are rigidly secured together at their outer ends by way of rigid attachment to a connecting bracket 42 having a U-shaped member 44 thereon which opens outwardly for journaling a guide wheel 46 therein for rotation about a vertical axis and for engagement with the inner periphery of the silo 12 in the same manner as the guide wheels 38 wherein the guide wheels 38 together with the guide wheels 46 engage the inner surface of the silo 12 at four equally spaced points thereby assuring that the silo unloader 10 will rotate evenly within the silo 12 and maintain a diametric relation thereto.

Positioned centrally within and extending through the frame 16 is a vertically disposed tubular housing 48 having a lower bell shaped tubular extension 50 projecting downwardly to the bottom of the frame 16 and projecting upwardly in an inwardly tapering tubular portion 52 for juncture with a curved discharge tube 54 that extends upwardly and outwardly through the wall of the cylindrical silo 12. The discharge tube 54 terminates in an inwardly facing channel-shaped lower end 56 slidably engaged with a peripheral and outwardly extending flange 58 on the upper end of the tapering portion 52 thereby rotatably securing the discharge tube 54 to the tapering portion 52 of the housing 48 thereby permitting the housing 48 to rotate in relation to the discharge tube 54 thereby permitting the unloader to rotate within the silo 12 and permitting the discharge tube 54 to remain in the same vertical plane although the discharge tube 54 will move downwardly with the silo unloader 10 as the silage 14 is removed from the silo 12.

The upper end of the tubular housing 48 at the juncture with the tapering portion 52 is provided with an inwardly extending support spider 60 supporting the upper end of a bearing 62 and the lower end of the tubular housing 48 adjusted within the upper end of the bell portion 50 is also provided with a support spider 64 supporting a lower bearing 66 for journaling a vertical shaft 68 therein. An enclosing covering 70 surrounds the portion of the shaft 68 between the bearings 62 and 66 and the covering 70 is provided with an opening 72 for permitting passage of a sprocket chain 74 which is engaged with a sprocket gear 76 on the shaft 68 and in engagement with a sprocket gear 78 on the drive shaft of an electric motor 80 mounted on a suitable bracket 82 on the exterior of the tubular housing 48 thereby providing rotational motion for the vertical shaft 68. The lower end of the vertical shaft 68 is provided with a hub portion 84 having a pair of diametrically opposed fan blades 86 projecting therefrom and generally conforming to the inner peripheral surface of the bell housing 50. The lower edge of the fan blade 86 is generally extended toward its direction of rotation as designated by the numeral 88 and terminates at its outer edge in a depending knife 90 for engaging the silage 14 and dislodging the same so that the silage will be picked up by the forwardly curved blade portion 88 and blown upwardly through the tubular housing 48 and outwardly through the discharge tube 54. Inasmuch as the spiders 60 and 64 together with the chain 74 form very little constriction in the flow the ensilage will be easily blown through the housing 48 and outwardly through the discharge tube 54. It will be understood that the fan blades 86 form an axial blowing effect and discharge ensilage mixed with air for assuring proper excavation of the ensilage 14 from the direct center of the silo 12. The electric motor 80 provides adequate power for rotation of the fan blades 86 at a sufficient speed to blow the ensilage from the tubular housing 48 after it has been drawn up by the suction created by the fan blades 86.

Figure 1:
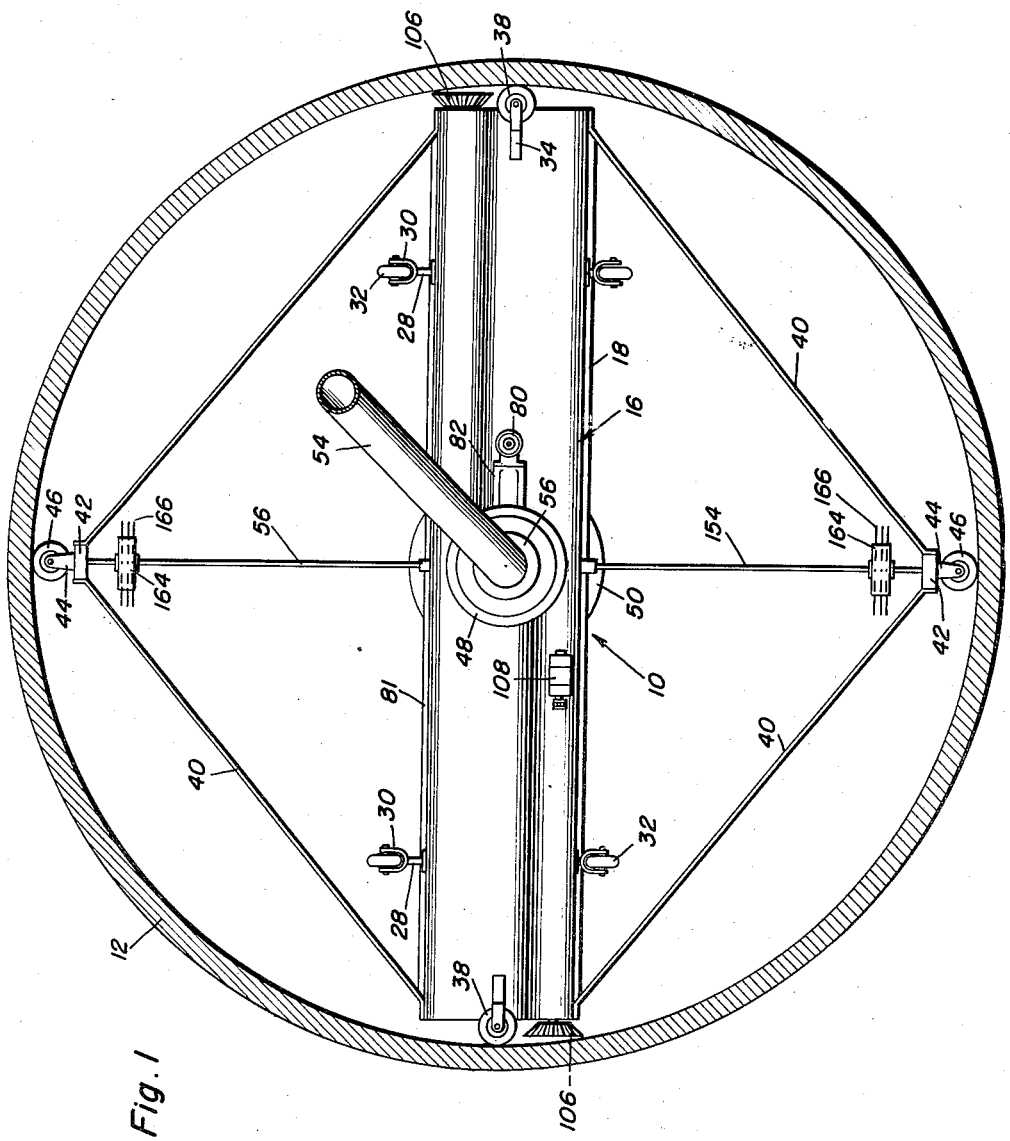
Figure 1 is a top plan view of the silo unloader of the present invention with the discharge tube and the silo being broken away.

Rotatably disposed within each end of the frame 16 and under the partition wall 26 is a screw auger conveyor 92 mounted at the inner ends on bracket members 94 and at the outer ends on bracket members 96. Disposed forwardly of the screw auger conveyors on each side of the central housing 48 is also a rotatable shaft 98 having a plurality of radially projecting curved tines 100 thereon. The rotatable shaft 98 is journaled in bearing members 102 at the inner ends thereof and 104 adjacent the outer ends thereof. The shaft 98 projects through the end wall of the shield 20 and is connected to a frusto-conical cutter 106 which is mounted exteriorly and at each end of the frame 16 for close engagement with the inner surface of the cylindrical wall of the silo 12 for cleaning all of the ensilage therefrom. It will be noted that the periphery of the cutter 106 depends below the shield 20 thereby assuring the removal of the silage adjacent the silo wall. Also, it will be noted that the shaft 98 and the tines 100 form diggers or agitators and are so disposed that they are in the path of movement of the screw auger conveyors 92 as the unloader 16 rotates within the silo 12. This relationship exists on each side of the housing 48 and the frusto-conical cutters 106 are positioned adjacent the leading edge of the frame 16 thereby assuring that the cutting edge of the frusto-conical cutters 106 will substantially come into contact with the inner surface of the silo 12 substantially as illustrated in Figure 1.

Figure 4:
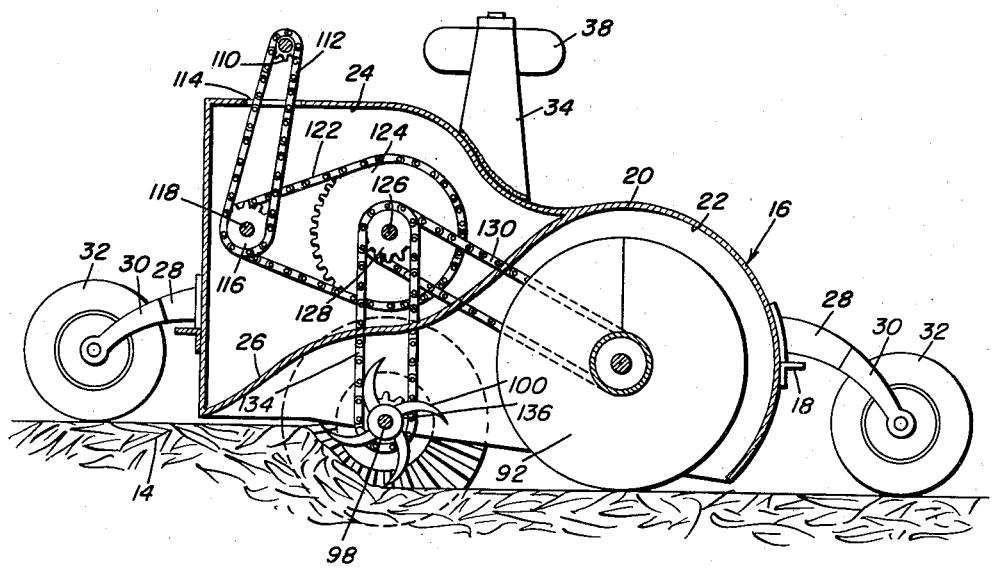
Figure 4 is a transverse, vertical sectional view taken substantially upon a plane passing along section line 4—4 of Figure 3 showing the details of construction of the screw auger conveyors together with the rotating diggers and the relative positioning thereof and the supporting wheels.

For driving the screw conveyors 92 and the shaft 98 as well as the cutters 106, an electric motor 108 is provided on the upper surface of the shield 20 and the driving shaft thereof is provided with a sprocket gear 110 with a sprocket chain 112 encircling the same and extending downwardly through an opening 114 in the upper forward compartment 24 formed by the shield 20. The sprocket chain 112 is in encircling engagement with a sprocket gear 116 mounted on a transverse shaft 118 which extends longitudinally of the frame 16 from one end thereof to a point past the central housing 48. At one end of the shaft 118 is provided a sprocket gear 120 having a sprocket chain 122 encircling the same and encircling a gear 124 on a stub shaft 126 which has sprocket gears mounted thereon for engagement with encircling chains 130 which engage a gear 132 for driving the screw auger conveyor 92 and a sprocket chain 134 for engaging a sprocket gear 136 for rotating the shaft 98 thereby rotating the tines 100 and the frusto-conical cutters 106. The other end of the shaft 118 is provided with a bevel gear 138 in meshing engagement with a bevel gear 140 attached to the end of a transverse shaft 142. The bevel gears 138 and 140 are positioned in a housing 144. The other end of the shaft 142 is provided with a bevel gear 146 which is in meshing engagement with a bevel gear 148 mounted on a longitudinal power shaft 150 wherein the bevel gears 146 and 148 are mounted in a housing 152. The shaft 150 extends in parallel relation to the shaft 118 for driving the screw conveyor 92 and the tines and shaft 98 together with the frusto-conical member 106 at the other end of the frame in the same manner as the conveyor 92 and the shaft 98 at the first mentioned end of the frame. Therefore, it will be seen that the shaft 98 are driven so that they turn upwardly and rearwardly toward the screw auger conveyor for picking up the ensilage 14 and throwing it over itself into the path of movement of the screw auger conveyor substantially as illustrated by the arrows in Figure 4.

For driving the unloader 10, a pair of power shafts 154 and 156 extend outwardly in perpendicular relation to the center of the frame 16 at the center thereof and are journaled at their outer ends in the connecting brackets 42 between the braces 40. The inner ends of the power shafts 154 and 156 are each provided with a bevel gear 158 in meshing engagement with a bevel gear 160 on the shaft 118 and the shaft 150 respectively. The bevel gears 158 and 160 are encased in a suitable housing 162 whereby the shafts 156 and 154 will be rotated in proper direction for driving the unloader 10 in a manner described hereinafter.

Secured to each of the shafts 154 and 156 is a silage engaging cylindrical drum 164 having a plurality of radial pointed spikes 166 which are disposed in peripherally spaced and aligned rows wherein the spikes 166 will engage the silage 14 thereby rotating the unloader 10 within the silo 12. Therefore, it will be seen that the electric motor 108 drives both of the diggers including the tines 100 and both of the screw auger conveyors 92 and the frusto-conical cutters 106. The motor 108 also drives the two driving drums 164 for rotating the unloader 10 within the silo as determined by the guide wheels 38 and 46 engaging the inner surface of the silo wall at four equally spaced points therein.

It will be understood that all necessary lubrication fittings and other details of construction will be included and the drawings merely show the principles of the invention and a construction for carrying out these principles. It will be noted that the screw auger conveyor is positioned in the rearward compartment 22 under the shield 20 and the digger including the tines 100 rotate against the silage 14 thereby digging up the silage 14 and passing the same up over the rotating shaft 98 thereby thoroughly loosening and providing easy conveying of the silage 14 inwardly by the screw auger conveyor 92. Also, it will be understood that various gearing arrangements may be utilized in order to rotate the diggers or tines 100 and the screw auger 92 at the desired relative speeds and the position of the supporting wheels 32 may be adjusted if desired. Due to the specific construction of the individual screw auger conveyors and the diggers positioned forwardly thereof and due to the particular guide wheel mechanism, it will be seen that the unloader 10 will rotate within the silo 12 under its own power and without any hoisting mechanism attached thereto. Also, it is possible and may be feasible in some instances to angulate the ends of the frame 16 downwardly or upwardly for cutting a convex or concave upper surface in the silage 14. This may be accomplished by a simple fitted arrangement within the frame and other slight modifications to the illustrated structure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A silo ensilage unloader comprising an elongated frame extending diametrically across a silo, a plurality of guide wheels supported from said frame for engaging the inner surface of the silo for guiding the rotational movement of said frame, silage engaging supporting wheels supported from said frame, silage engaging driving wheels supported from said frame, means on said frame for conveying silage to the center of the silo, vertical lift fan means for excavating silage from the center of the silo and discharging the silage axially of the fan means, means for driving said driving wheels and silage conveying means, and independent means for driving said fan means.

2. A silo ensilage unloader comprising an elongated frame extending diametrically across a silo, a plurality of guide wheels supported from said frame for engaging the inner surface of the silo for guiding the rotational movement of said frame, silage engaging supporting wheels supported from said frame, silage engaging driving wheels supported from said frame, means on said frame for conveying silage to the center of the silo, fan means for excavating silage from the center of the silo, means for driving said driving wheels and silage conveying means, and means for driving said fan means, said silage conveying means including a pair of oppositely extending radial auger conveyors urging the silage radially inwardly to the center of the silo, and a digger mounted forwardly of each auger conveyor, each of said diggers including a rotatable shaft, and a plurality of projecting radial tines, said tines being curved, said diggers rotating in a direction for moving the lower tines forwardly and upwardly for moving silage over the diggers into the path of the auger conveyors.

3. A silo ensilage unloader comprising an elongated frame extending diametrically across a silo, a plurality of guide wheels supported from said frame for engaging the inner surface of the silo for guiding the rotational movement of said frame, silage engaging supporting wheels supported from said frame, silage engaging driving wheels supported from said frame, means on said frame for conveying silage to the center of the silo, fan means for excavating silage from the center of the silo, means for driving said driving wheels and silage conveying means, and means for driving said fan means, said fan means including an elongated curved pipe, an enlarged central housing mounted on said frame, said pipe being swivelly attached to the upper end of the housing in communication therewith, a vertical shaft rotatably supported in said housing in alignment with the pipe, a fan blade on the bottom of said shaft for rotation in said housing for picking up and blowing the silage in an axial direction through the tubular pipe, power means disposed exteriorly of said housing, and means connecting the power means to the vertical shaft for driving the shaft and fan blade.

4. A silo ensilage unloader comprising an elongated frame extending diametrically across a silo, a plurality of guide wheels supported from said frame for engaging the inner surface of the silo for guiding the rotational movement of said frame, silage engaging supporting wheels supported from said frame, silage engaging driving wheels supported from said frame, means on said frame for conveying silage to the center of the silo, fan means for excavating silage from the center of the silo, means for driving said driving wheels and silage conveying means, and means for driving said fan means, said silage conveying means including a pair of oppositely extending radial auger conveyors urging the silage radially inwardly to the center of the silo, and a digger mounted forwardly of each auger conveyor, each of said diggers including a rotatable shaft, and a plurality of projecting radial tines, said tines being curved, said diggers rotating in a direction for moving the lower tines forwardly and upwardly for moving silage over the diggers into the path of the auger conveyors, said frame including a covering shield disposed over said conveying means.

5. A silo ensilage unloader comprising an elongated frame extending diametrically across a silo, a plurality of guide wheels supported from said frame for engaging the inner surface of the silo for guiding the rotational movement of said frame, silage engaging supporting wheels supported from said frame, silage engaging driving wheels supported from said frame, means on said frame for conveying silage to the center of the silo, fan means for excavating silage from the center of the silo, means for driving said driving wheels and silage conveying means, and means for driving said fan means, said silage conveying means including a pair of oppositely extending radial auger conveyors urging the silage radially inwardly to the center of the silo, and a digger mounted forwardly of each auger conveyor, each of said diggers including a rotatable shaft, and a plurality of projecting radial tines, said tines being curved, said diggers rotating for moving silage over the diggers into the path of the auger conveyors, said frame including a covering shield disposed over said conveying means, said frame having a pair of frusto-conical cutters mounted forwardly of the auger conveyors for removing silage from the inner surface of the silo and moving the silage radially inwardly thereby assuring that the upper surface of the silage will be retained in level condition.

6. A silo ensilage unloader comprising an elongated frame extending diametrically across a silo, a plurality of guide wheels supported from said frame for engaging the inner surface of the silo for guiding the rotational movement of said frame, silage engaging supporting wheels supported from said frame, silage engaging driving wheels supported from said frame, means on said frame for conveying silage to the center of the silo, fan means for excavating silage from the center of the silo, means for driving said driving wheels and silage conveying means, and means for driving said fan means, said silage conveying means including a pair of oppositely extending radial auger conveyors urging the silage radially inwardly to the center of the silo, and a digger mounted forwardly of each auger conveyor, each of said diggers including a rotatable shaft, and a plurality of projecting radial tines, said tines being curved, said diggers rotating for moving silage over the diggers into the path of the auger conveyors, said frame including a covering shield disposed over said conveying means, said frame having a pair of frusto-conical cutters mounted forwardly of the auger conveyors for removing silage from the inner surface of the silo and moving the silage radially inwardly thereby assuring that the upper surface of the silage will be retained in level condition, said driving wheels including a cylindrical drum positioned on each side of said frame, a plurality of spikes on each of said drums for engaging the silage, said drums being mounted on a driving shaft for rotating said frame.

7. A silo ensilage unloader comprising an elongated frame extending diametrically across a silo, a plurality of guide wheels supported from said frame for engaging the inner surface of the silo for guiding the rotational movement of said frame, silage engaging supporting wheels supported from said frame, silage engaging driving wheels supported from said frame, means on said frame for conveying silage to the center of the silo, fan means for excavating silage from the center of the silo, means for driving said driving wheels and silage conveying means, and means for driving said fan means, said silage conveying means including a pair of oppositely extending radial auger conveyors urging the silage radially inwardly to the center of the silo, and a digger mounted forwardly of each auger conveyor, each of said diggers including a rotatable shaft, and a plurality of projecting radial tines, said tines being curved, said diggers rotating for moving silage over the diggers into the path of the auger conveyors, said frame including a covering shield disposed over said conveying means, said frame having a pair of frusto-conical cutters for removing silage from the inner surface of the silo thereby assuring that the upper surface of the silage will be retained in level condition, said driving wheels including a cylindrical drum positioned on each side of said frame, a plurality of spikes on each of said drums for engaging the silage, said drums being mounted on a driving shaft for rotating said frame, said fan means including an elongated curved pipe, an enlarged central housing mounted on said frame, said pipe being swivelly attached to the upper end of the housing in communication therewith, a vertical shaft rotatably supported in said housing, a fan blade on the bottom of said shaft for rotation in said housing for picking up and blowing the silage through the tubular pipe, power means disposed exteriorly of said housing, and means connecting the power means to the vertical shaft for driving the shaft and fan blade.

8. A silo ensilage unloader comprising an elongated frame extending diametrically across a silo, a plurality of guide wheels supported from said frame for engaging the inner surface of the silo for guiding the rotational movement of said frame, silage engaging supporting wheels supported from said frame, silage engaging driving wheels supported from said frame, means on said frame for conveying silage to the center of the silo, fan means for excavating silage from the center of the silo, means for driving said driving wheels and silage conveying means, and means for driving said fan means, said silage conveying means including a pair of oppositely extending radial auger conveyors urging the silage radially inwardly to the center of the silo, and a digger mounted forwardly of each auger conveyor, each of said diggers including a rotatable shaft, and a plurality of projecting radial tines, said tines being curved, said diggers rotating for moving silage over the diggers into the path of the auger conveyors, said frame having a pair of frusto-conical cutters for removing silage from the inner surface of the silo thereby assuring that the upper surface of the silage will be retained in level condition, said digger shafts projecting outwardly from the ends of said frame, said frusto-conical cutters being mounted on the ends of said digger shafts for rotation therewith for dragging silage radially inwardly.

9. A silo unloader comprising a supporting frame disposed for rotation in a silo, guide wheels mounted on said frame for engagement with the interior of the silo in circumferentially spaced relation, screw auger conveyor means for moving silage radially inwardly of the silo, digger means disposed forwardly of the screw auger conveyor means for loosening silage and discharging the same forwardly of the screw auger conveyor means, vertical lift fan means disposed at the inner end of the conveyor means for picking up silage axially and discharging the same axially and exteriorly of the silo, said fan means forming the sole means for moving the silage from the inner end of the conveyor means to the exterior of the silo.

References Cited in the file of this patent

UNITED STATES PATENTS

| | | |
|---|---|---|
| 2,500,043 | Radtke | Mar. 7, 1950 |
| 2,663,594 | Dennick | Dec. 22, 1953 |
| 2,671,696 | McLean | Mar. 9, 1954 |
| 2,719,058 | Van Dusen | Sept. 27, 1955 |